(12) United States Patent
Wick et al.

(10) Patent No.: US 6,421,185 B1
(45) Date of Patent: Jul. 16, 2002

(54) WIDE FIELD-OF-VIEW IMAGING SYSTEM USING A SPATIAL LIGHT MODULATOR

(75) Inventors: David V. Wick, Albuquerque; Ty Martinez, Edgewood; Mark A. Kramer, Albuquerque, all of NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/681,485

(22) Filed: Apr. 16, 2001

(51) Int. Cl.[7] .............................................. G02B 27/14
(52) U.S. Cl. ..................................................... 359/637
(58) Field of Search ................................ 359/252, 253, 359/637, 223, 362; 345/7; 353/8

(56) References Cited

U.S. PATENT DOCUMENTS

| | | | | |
|---|---|---|---|---|
| 5,341,312 A | * | 8/1994 | Lisson et al. ................ | 359/223 |
| 5,764,407 A | * | 6/1998 | Nanba .......................... | 359/362 |
| 5,993,004 A | * | 11/1999 | Moseley et al. ................ | 353/8 |
| 6,023,253 A | * | 2/2000 | Taniguchi et al. ............. | 345/7 |

OTHER PUBLICATIONS

Geisler, W. S. and Perry, J. S. (1998), "A real–time foveated multi–resolution system for low–bandwidth video communication," In B. Rogowitz and T. Pappas (Eds.), *Human Vision and Electronic Imaging*, SPIE Proceedings, 3299, 294–305.

* cited by examiner

*Primary Examiner*—Georgia Epps
*Assistant Examiner*—Gary O'Neill
(74) *Attorney, Agent, or Firm*—James M. Skorich; Kenneth E. Callahan

(57) ABSTRACT

A foveated imaging system using a relatively simple optical imaging system with a spatial light modulator located at or near a pupil plane to correct aberrations. Maximum resolution is obtained for a limited region defined by a single fixation point (a foveal region) within the field of view. The fixation point can be changed manually, by using a predetermined scan pattern, or automatically varied for surveillance or tracking applications.

4 Claims, 1 Drawing Sheet

WIDE FIELD-OF-VIEW IMAGING SYSTEM USING A SPATIAL LIGHT MODULATOR

FEDERAL RESEARCH STATEMENT

[The conditions under which this invention was made are such as to entitle the Government of the United States under paragraph I(a) of Executive Order 10096, as represented by the Secretary of the Air Force, to the entire right, title and interest therein, including foreign rights.]

BACKGROUND OF INVENTION

The invention relates generally to wide field of view optical systems and more particularly to providing a foveated imaging optical system using a simplified optical system with a spatial light modulator.

The human eye has a wide field of view (FOV) but the spatial resolution decreases as a function of the angular distance from the direction of gaze or point of fixation. The retina has a high concentration of cone photoreceptors within a few degrees of the point of gaze. This central area of high cone density is called the fovea. Cone density and consequently spatial resolution fall off rapidly with increasing field angle measured from the point of fixation. Resolution drops 50% at 2.5 degrees off the point of gaze and by a factor of ten at 20 degrees.

This phenomenon has been exploited in a number of ways to reduce the bandwidth required to transmit digital images. For example, a spatially variant filter or a software algorithm might be applied to an otherwise high-resolution image that would maintain high fidelity around a fixed point in the field-of-view, the region of interest, while reducing spatial resolution over the rest of the image. This foveated imaging mimics the human eye and reduces the bandwidth needed to transmit the useful image. Eye tracking apparatus or a computer mouse might be used at the receiving end to move the region of interest over the image. The spatially variant filter would then track this "eye" movement, keeping the high-resolution portion of the image at the point of gaze., (Geisler, W. S. and Perry, J. S. (1998), "A real-time foveated multi-resolution system for low-bandwidth video communication," In B. Rogowitz and T. Pappas (Eds.), *Human Vision and Electronic Imaging*, SPIE Proceedings, 3299, 294–305.)

While these foveated-imaging systems reduce the required bandwidth of digitally transmitted images, they still require high-quality and potentially complex optical imaging systems to produce the initial high-resolution images, i.e., near diffraction limited quality over the entire image for wide FOV, low f-number systems. There is a need for a relatively simple and inexpensive optical imaging system with a wide FOV and low f-number that would create a foveated image at the transmitting end of a video transmission, i.e., an optical imaging system that would yield high resolution only for that portion of the image corresponding to the region of interest at the receiving end. Degraded resolution would be acceptable away from the point of fixation or interest.

SUMMARY OF INVENTION

A preferred embodiment of the invention uses a relatively simple and potentially inexpensive optical system with a spatial light modulator (SLM) located at or near a pupil plane to produce a foveated image. This system increases the useable FOV of a wide-angle, low f-number optical imaging system. The SLM is programmed to correct aberrations and, therefore, provide maximum resolution at a particular point of interest within the FOV of the system. Degraded resolution occurs away from the point of interest, mimicking the variable spatial resolution of the human eye. This enables a simple and inexpensive optical imaging system to be employed for a fixed, wide-angle, low f-number surveillance system, for example, while taking advantage of the reduced bandwidth necessary to transmit the image to a remote site. The point of interest can be remotely varied using a preset scan pattern, an eye tracking apparatus, track ball, or other device. The system can also be used for tracking the movement of an object of interest within the FOV.

Other aspects and advantages of the present invention will become apparent from the following detailed description, taken in conjunction with the accompanying drawing, illustrating by way of example the principles of the invention.

DETAILED DESCRIPTION

Figure 1:
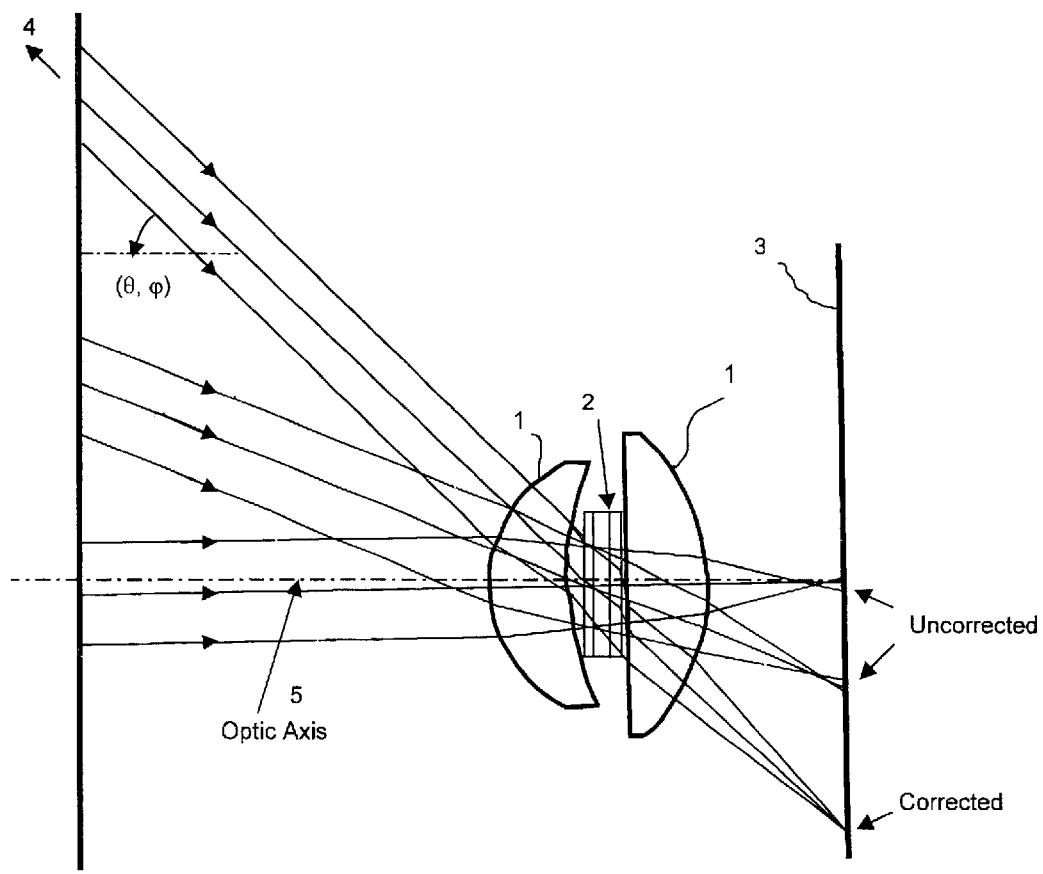
FIG. 1 is a cross-section of a simple optical imaging system with the SLM near a pupil plane correcting the aberrations for a portion of the image at a selected off-axis angle corresponding to the point of interest.

A relatively simple and potentially inexpensive wide FOV, low f-number optical system with a spatial light modulator (SLM) located at or near a pupil plane can be used to directly produce a foveated image. This image can then be transmitted at a reduced bandwidth to a remote-viewing site. A simple optical imaging system typically has a limited useful FOV due to numerous off-axis aberrations that degrade image quality. This is particularly true for a low f-number optical imaging system. To provide the best possible resolution for the entire FOV typically requires a complex and expensive optical imaging system. This high quality image would then be degraded except for the point of interest for bandwidth limited transmission from a remote site.

A transmissive, liquid crystal spatial light modulator (SLM) placed at or near a pupil plane of a simple optical imaging system, however, can produce near diffraction-limited resolution at much larger field angles than would otherwise be possible. Field angles are used here to locate a point of gaze or fixation point within the FOV. They can be defined by polar coordinates $(\theta, \phi)$ referenced to the optical axis, A consequence of improving the resolution at a particular region of the image is to degrade the resolution of the remaining part. Thus, within a large field-of-view image, a limited region of interest (foveal region) would have high-resolution and appear in-focus and peripheral areas would appear somewhat out of focus. This system is similar to the operation of the human eye and is called foveated imaging. Foveated imaging is a consequence of the present invention because it is only possible to correct for a single point of interest at any given time using an SLM. The in focus region can be arbitrarily moved around the FOV by controlling the SLM.

An advantage of a foveated imaging system is the reduction in bandwidth requirements for data processing and transmission because only the area of interest contains high-resolution data. This concept can be applied to many optical imaging systems, including existing systems that are being retrofitted or new systems that are specifically designed to take advantage of this technique.

FIG. 1 illustrates an example of how the foveated imaging system concept might be implemented using a transmissive, liquid crystal SLM. A simple optical imaging system, in this case two lenses/collect light over a wide FOV. The SLM 2 is placed at or near the pupil plane and is used to correct aberrations at any point within the FOV. The image appears in focus at the detection plane 3 for a selected point of interest 4 defined by the field angles θ, φ referenced to the optic axis 5.

SLM's consist of many liquid crystal pixels, each of which is independently addressed to provide the desired wavefront correction. The voltages applied to individual pixels would be calibrated prior to deployment to correct for the particular aberrations of that optical imaging system for the range of potential fixation points on the image. In polar coordinates, there would be an optimum SLM setting for each quantized θ, φ) (field angles) combination. The SLM settings for a particular optical system could be stored in a look-up table with entries for each field angle combination. If the optical imaging system were perfectly symmetric, aberrations would be corrected over an annulus about the optical axis encompassing the point of interest. The portion of the image being viewed at any given time (point of gaze or fixation point) can be varied by a predetermined scan pattern or by using an eye tracking apparatus, track ball, or other device.

The system readily lends itself to real-time surveillance, either at the imaging system site or at a remote location. Remote surveillance would require less transmission bandwidth than the prior art since only the region of interest is highly resolved. A two-way transmission linkage could accomplish remote control of the SLM for varying the point of interest. In either case, the complexity and expense of the optical imaging system would be much reduced.

Optical tracking is another application that would benefit from this foveated imaging system with the foveal region locked on an object of interest either manually or automatically. Normally, a low resolution, wide FOV optical system is used to acquire a moving object of interest using frame to frame comparisons to detect any movement. Once detected, the object is handed off to a second high-resolution optical system with a limited field of view for automated, high-resolution tracking and identification. The present invention could perform both the acquisition and tracking functions. A moving object of interest would be automatically detected and the SLM re-addressed to obtain a high-resolution image. Automated detection of the movement would then yield the position of the object as a function of time.

We claim:

1. A foveated imaging system comprised of:
   an optical imaging system having a field of view, off-axis aberrations, and a pupil plane;
   a liquid crystal spatial light modulator positioned at or near the pupil plane of the optical imaging system to correct the aberrations at a fixation point within the field of view;
   means for varying the fixation point over time; and
   means for controlling the spatial light modulator whereby maximum resolution is obtained at any particular fixation point as the fixation point is varied over time.

2. The foveated imaging system of claim 1, wherein the means for varying the fixation point over time is a eye movement tracking system.

3. The foveated imaging system of claim 1, wherein the means for varying the fixation point over time is a computer track ball or a computer mouse.

4. The foveated imaging system of claim 1, wherein the foveated imaging system is further comprised of a means for automatically acquiring and tracking a moving object within the field of view.

* * * * *